United States Patent
Chin et al.

(10) Patent No.: US 7,920,077 B2
(45) Date of Patent: Apr. 5, 2011

(54) METHOD AND SYSTEM FOR DECOMPRESSING AT LEAST TWO TWO-VALUED SYMBOL SEQUENCES INTO A THREE-VALUED COMMUNICATION SEQUENCE

(75) Inventors: Po Shin Francois Chin, Singapore (SG); Yuen-Sam Kwok, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 12/299,307

(22) PCT Filed: May 3, 2007

(86) PCT No.: PCT/SG2007/000125
§ 371 (c)(1),
(2), (4) Date: Aug. 11, 2009

(87) PCT Pub. No.: WO2007/126394
PCT Pub. Date: Nov. 8, 2007

(65) Prior Publication Data
US 2009/0303089 A1     Dec. 10, 2009

Related U.S. Application Data

(60) Provisional application No. 60/797,199, filed on May 3, 2006.

(51) Int. Cl.
*H03M 5/16* (2006.01)
(52) U.S. Cl. ............................................. 341/57; 341/56
(58) Field of Classification Search .................... 341/57, 341/58, 56; 375/286, 287; 360/40
See application file for complete search history.

(56) References Cited

U.S. PATENT DOCUMENTS

| | | | | | |
|---|---|---|---|---|---|
| 3,876,944 | A | * | 4/1975 | Mack et al. ................... | 375/286 |
| 3,927,401 | A | * | 12/1975 | McIntosh ........................ | 341/57 |
| 4,419,757 | A | * | 12/1983 | De Gennaro et al. ......... | 375/286 |
| 5,438,533 | A | * | 8/1995 | Yoshida ........................ | 708/493 |

* cited by examiner

*Primary Examiner* — Brian Young
(74) *Attorney, Agent, or Firm* — K. David Crockett, Esq.; Crockett & Crockett, PC

(57) ABSTRACT

A method for decompressing at least two two-valued symbol sequences into a three-valued communication sequence is described comprising converting a first two-valued symbol sequence into an intermediate symbol sequence and symbol-wise multiplying the intermediate symbol sequence with the second two-valued symbol sequence to generate the three-valued communication sequence.

15 Claims, 18 Drawing Sheets

Fig. 14

METHOD AND SYSTEM FOR DECOMPRESSING AT LEAST TWO TWO-VALUED SYMBOL SEQUENCES INTO A THREE-VALUED COMMUNICATION SEQUENCE

CROSS-REFERENCE TO RELATED APPLICATIONS

The present application claims the benefit of U.S. provisional application 60/797,199 filed 3 May 2006, the content of which is incorporated herein by reference in its entirety for all purposes.

FIELD OF THE INVENTION

The invention relates to a method and a system for decompressing at least two two-valued symbol sequences into a three-valued communication sequence and a computer program element.

BACKGROUND OF THE INVENTION

In UWB (ultra wide band) radio communication, information is transmitted spread over a large spectrum (typically more than 500 MHz). One method for realizing this is impulse radio where information is transmitted in form of impulse sequences.

For synchronization between a transmitter and receiver or channel estimation, for example, pre-defined impulse sequences are sent by the transmitter.

An object of the invention is to provide a method for providing impulse sequences for example suitable for synchronization, channel estimation etc in a UWB communication system with low memory requirement.

SUMMARY OF THE INVENTION

A method for decompressing at least two two-valued symbol sequences into a three-valued communication sequence is provided comprising converting a first two-valued symbol sequence into an intermediate symbol sequence and symbol-wise multiplying the intermediate symbol sequence with the second two-valued symbol sequence to generate the three-valued communication sequence.

Further, a system and a computer program product according to the method for decompressing at least two two-valued symbol sequences into a three-valued communication sequence are provided.

SHORT DESCRIPTION OF THE FIGURES

Illustrative embodiments of the invention are explained below with reference to the drawings.

FIG. 14 shows ternary code sequences according to an embodiment of the invention.

DETAILED DESCRIPTION

Figure 1:
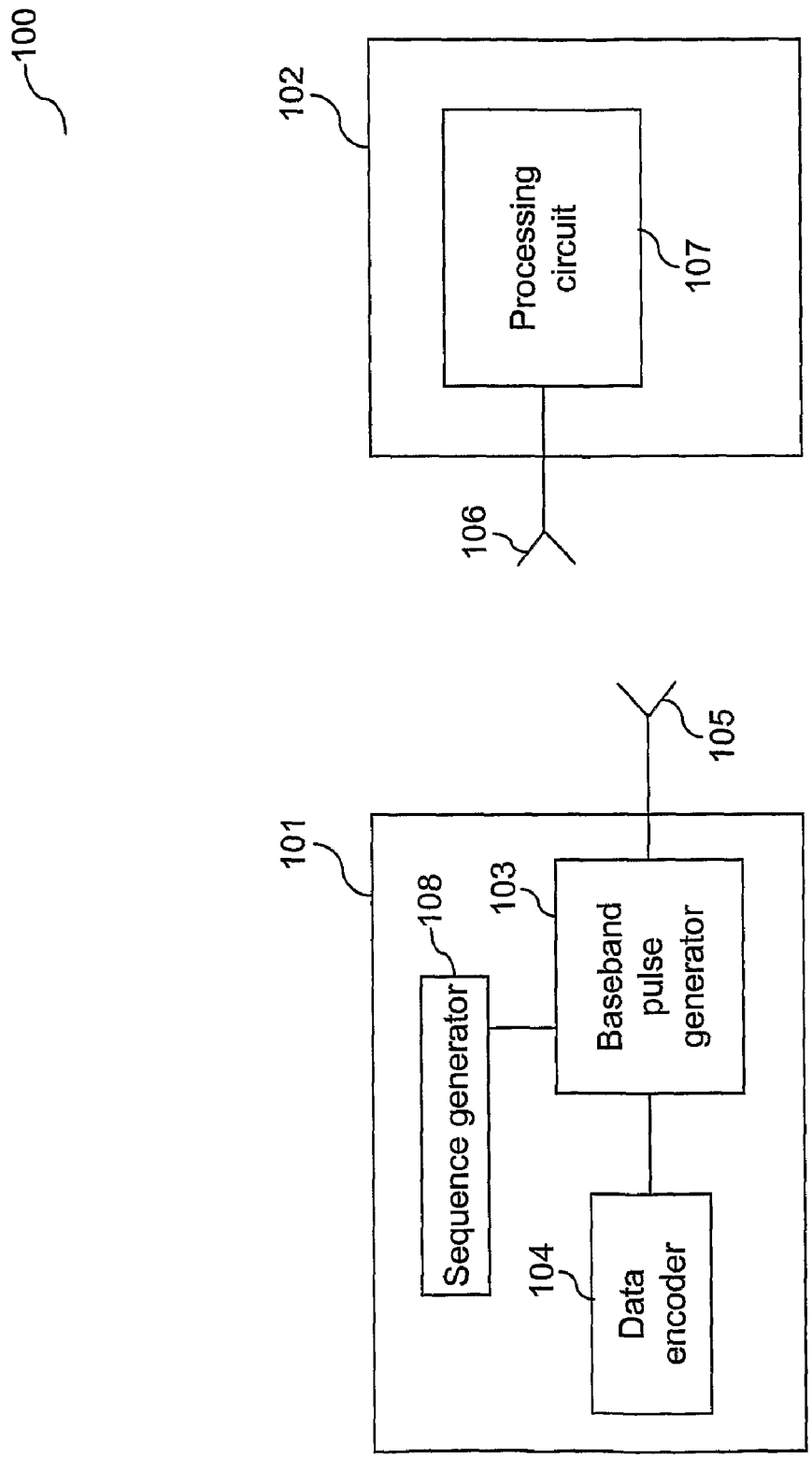
FIG. 1 shows a communication system according to an embodiment of the invention.

Illustratively, two two-valued sequences are combined in such a way that the three-valued communication sequence is generated. According to some embodiments of the invention, the two-valued sequences are characterized by parameters which require far less memory to be stored than the three-valued communication sequence would need. In some embodiments, the communication sequence has characteristics which make it well suited for radio communication purposes, such as transmitter-receiver synchronization and channel estimation. Embodiments of the invention therefore provide a way to make use of a communication sequence with desirable characteristics without high memory requirements which is especially an issue for communication devices with relatively low memory, such as sensor-network devices.

A two-valued symbol sequence is a sequence the components of which are from a set of two elements (for example complex or real numbers). For example, bipolar sequences and unipolar sequences are two-valued sequences.

A bipolar sequence is a sequence the components of which are all from a set of one negative value and one positive value, e.g. {−1, 1}. For example, −1, 1, −1, −1, 1 is a bipolar sequence.

A unipolar sequence is a sequence the components of which are all from a set of 0 and a positive value, e.g. {0, 1}. For example, 0, 1, 0, 0, 1 is a unipolar sequence.

A three-valued sequence is a sequence the components of which are from a set of three elements (for example complex or real numbers). For example, a ternary sequence is a three-valued sequence.

A ternary sequence is a sequence the components of which are all from a set of one negative value and one positive value and 0, e.g. {−1, 0, 1}. For example, 0, 1, −1, −1, 0 is a ternary sequence.

In one embodiment, the intermediate symbol sequence is a two-valued symbol sequence.

In one embodiment, the first two-valued symbol sequence is a bipolar symbol sequence and the intermediate sequence is a unipolar sequence or the first two-valued symbol sequence is a unipolar symbol sequence and the intermediate sequence is a bipolar sequence.

The three-valued communication sequence is for example a ternary sequence.

The second two-valued symbol sequence is for example a bipolar symbol sequence or a unipolar symbol sequence.

In one embodiment, the three-valued communication sequence is to be transmitted from a transmitter to a receiver for the purpose of at least one of channel estimation ranging synchronization.

The first two-valued symbol sequence is for example generated using a first shift register. The second two-valued symbol sequence may be generated using a second shift register.

In one embodiment, the first two-valued symbol sequence is generated by cyclic-shifting a third two-valued symbol sequence.

The third two-valued sequence is for example a maximal length sequence. In one embodiment, the third two-valued sequence has a component sum of one.

The first two-valued symbol sequence is for example generated by multiplying a third two-valued sequence and a fourth two valued sequence. Therein, the third two-valued sequence or the fourth two-valued sequence or both may be maximal length sequences. The third two-valued sequence or the fourth two-valued sequence or both may have a component sum of one.

In one embodiment, the second two-valued symbol sequence is generated by cyclic-shifting a fifth two-valued symbol sequence by a pre-determined number of components.

In the embodiments described below, the symbol sequences and the communication sequence are also referred to as code sequences. A component of a code sequence is also called a chip. The code sequences described in the following for example each comprise N chips.

A circuit can be a hardware circuit designed for the respective functionality or also a programmable unit, such as a processor, programmed for the respective functionality.

FIG. 1 shows a communication arrangement 100 according to an embodiment of the invention.

The communication arrangement comprises a transmitter 101 and a receiver 102. The transmitter 101 and the receiver 102 communicate using UWB (ultra wide band) radio communication technology which is in this example realized by impulse radio.

The transmitter 101 comprises a baseband pulse generator 103 which receives code sequences from a data encoder 104. The code sequences are in this example ternary sequences, i.e. each component of a code sequence has the value −1, +1 or 0. When a code sequence is supplied to the baseband pulse generator 103, it generates a pulse sequence according to the code sequence and transmits this pulse sequence via a transmit antenna 105.

For example, the data encoder 104 encodes data to be sent into a code sequence and supplies it to the baseband pulse generator 103 which generates and sends a corresponding pulse sequence. The receiver 102 receives the pulse sequence via a receive antenna 106, converts it back to the code sequence and a processing circuit 107 of the receiver 107 decodes the code sequence to get the data.

In addition to sending pulse sequences for data transmission, the transmitter 101 may also send pulse sequences which, for example, allow the receiver 102 to synchronize with the transmitter 101, to allow the receiver to perform a channel estimation of the communication channel between the transmitter 101 and the receiver 102 or for ranging purposes, for example for estimating the distance between the transmitter 101 and the receiver 102.

These pulse sequences are generated by the baseband pulse generator 103 in accordance with code sequences generated by a code sequence generator 108.

In the following examples for code sequence generators are described which may, for example, be used as the code sequence generator 108.

Figure 2:
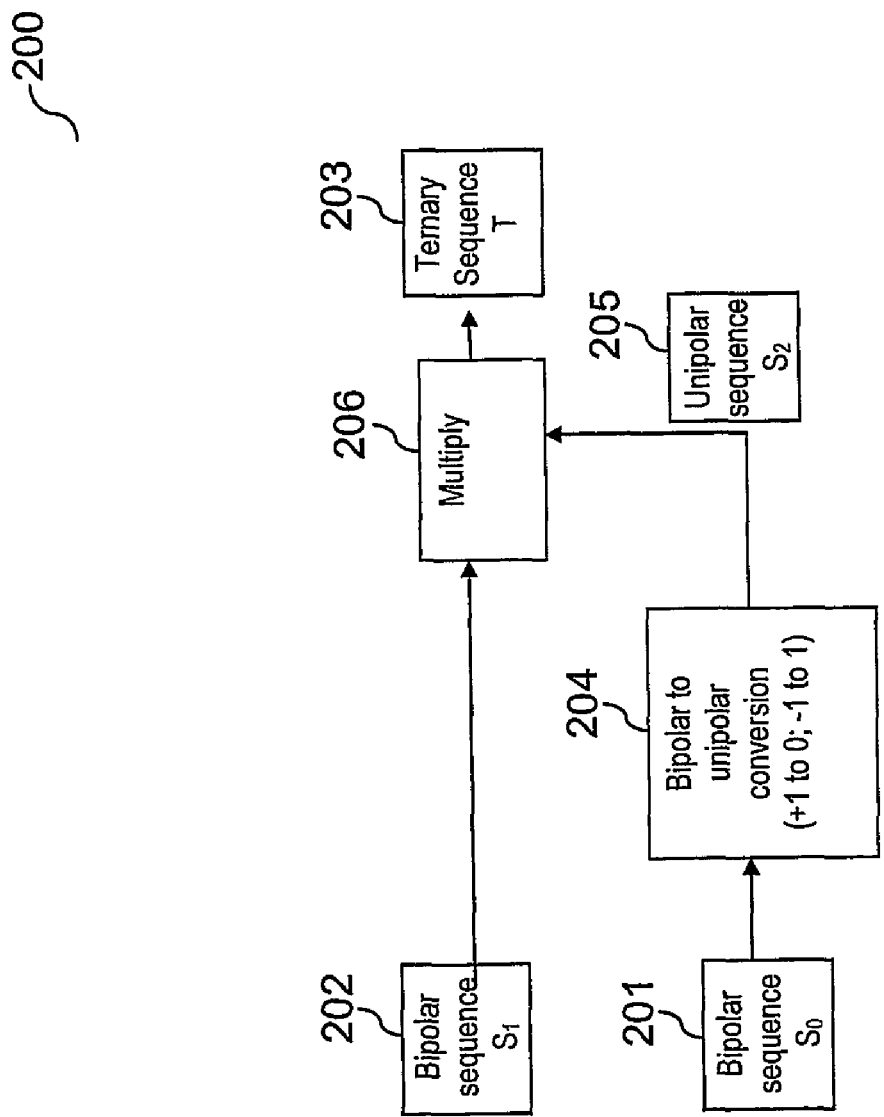
FIG. 2 shows a code sequence generator according to an embodiment of the invention.

FIG. 2 shows a code sequence generator 200 according to an embodiment of the invention.

The code generator 200 uses a first bipolar sequence 201 and a second bipolar sequence 202 to generate a ternary sequence 203 which is the output code sequence and is for example passed to the baseband pulse generator 103.

The first bipolar sequence 201 is converted by a converting circuit 204 to a unipolar sequence 205. The converting circuit 204 maps a +1 to a 0 and a −1 to a 1. The unipolar sequence 205 is multiplied symbol-wise, i.e. component-wise, with the second bipolar sequence 202 by a multiplying circuit 206. The result of the multiplication is the ternary sequence 203.

Figure 3:
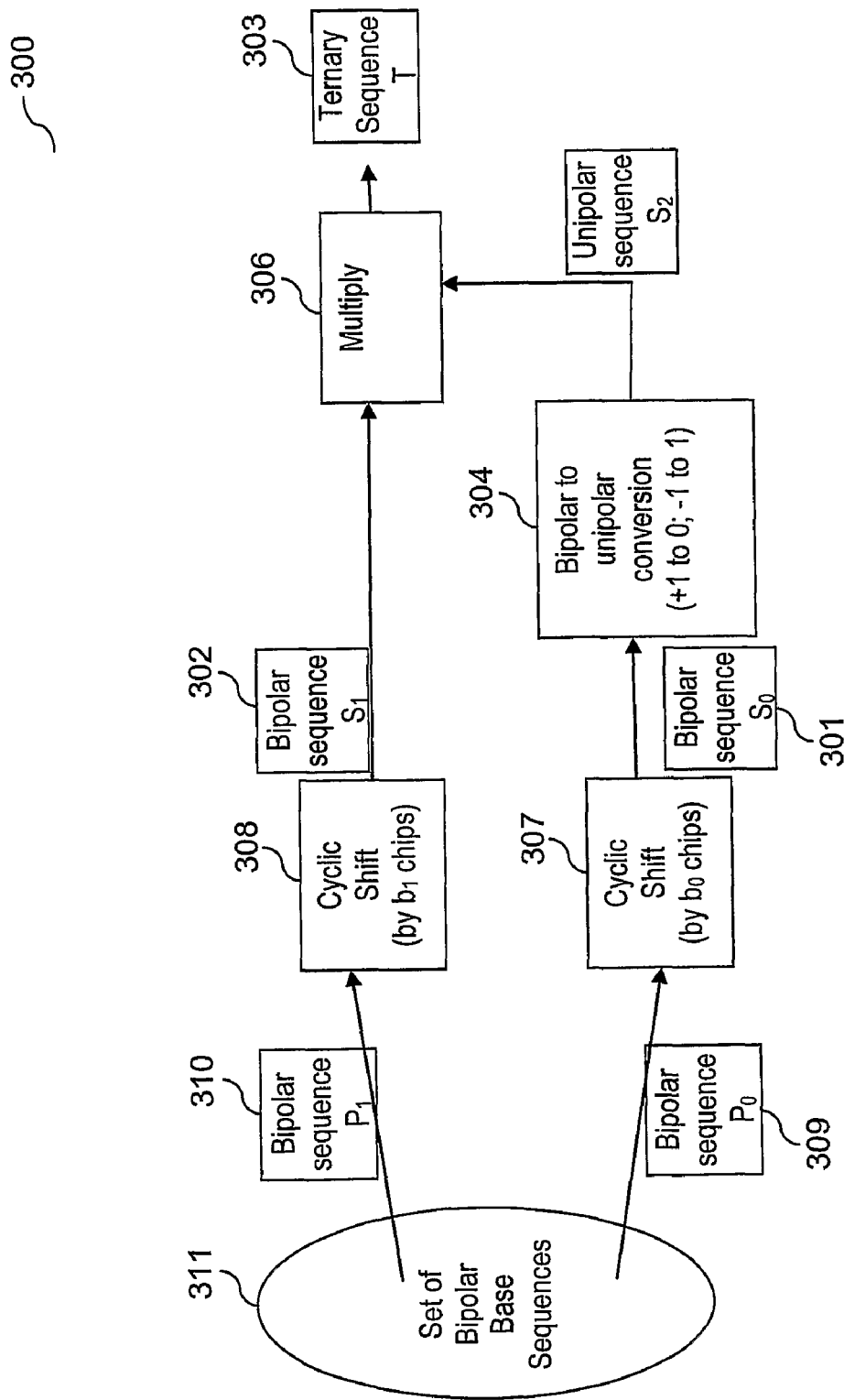
FIG. 3 shows a code sequence generator according to an embodiment of the invention.

The first bipolar sequence 201 and the second bipolar sequence 202 are for example generated as shown in FIG. 3.

FIG. 3 shows a code sequence generator 300 according to an embodiment of the invention.

Similar to the code sequence generator 200 shown in FIG. 2, the code sequence generator 300 comprises a converting circuit 304 and a multiplying circuit 306 which generate a ternary sequence 303 which is the output code sequence from a first bipolar sequence 301 and a second bipolar sequence 302.

The code sequence generator 300 further comprises a first cyclic shift circuit 307 which cyclic-shifts a third bipolar sequence 309 to generate the first bipolar sequence 301.

The code sequence generator 300 further comprises a second cyclic shift circuit 308 which cyclic-shifts a fourth bipolar sequence 310 to generate the second bipolar sequence 302.

The third bipolar sequence 309 and the fourth bipolar sequence 310 are for example code sequences from a set of N-chip bipolar base sequences 311.

For example, the code sequences in the set of N-chip bipolar base sequences 311 are M-sequences (Maximal length sequences). In one embodiment, for each sequence in the set of N-chip bipolar base sequences 311 the sum of components equals to 1.

Figure 4:
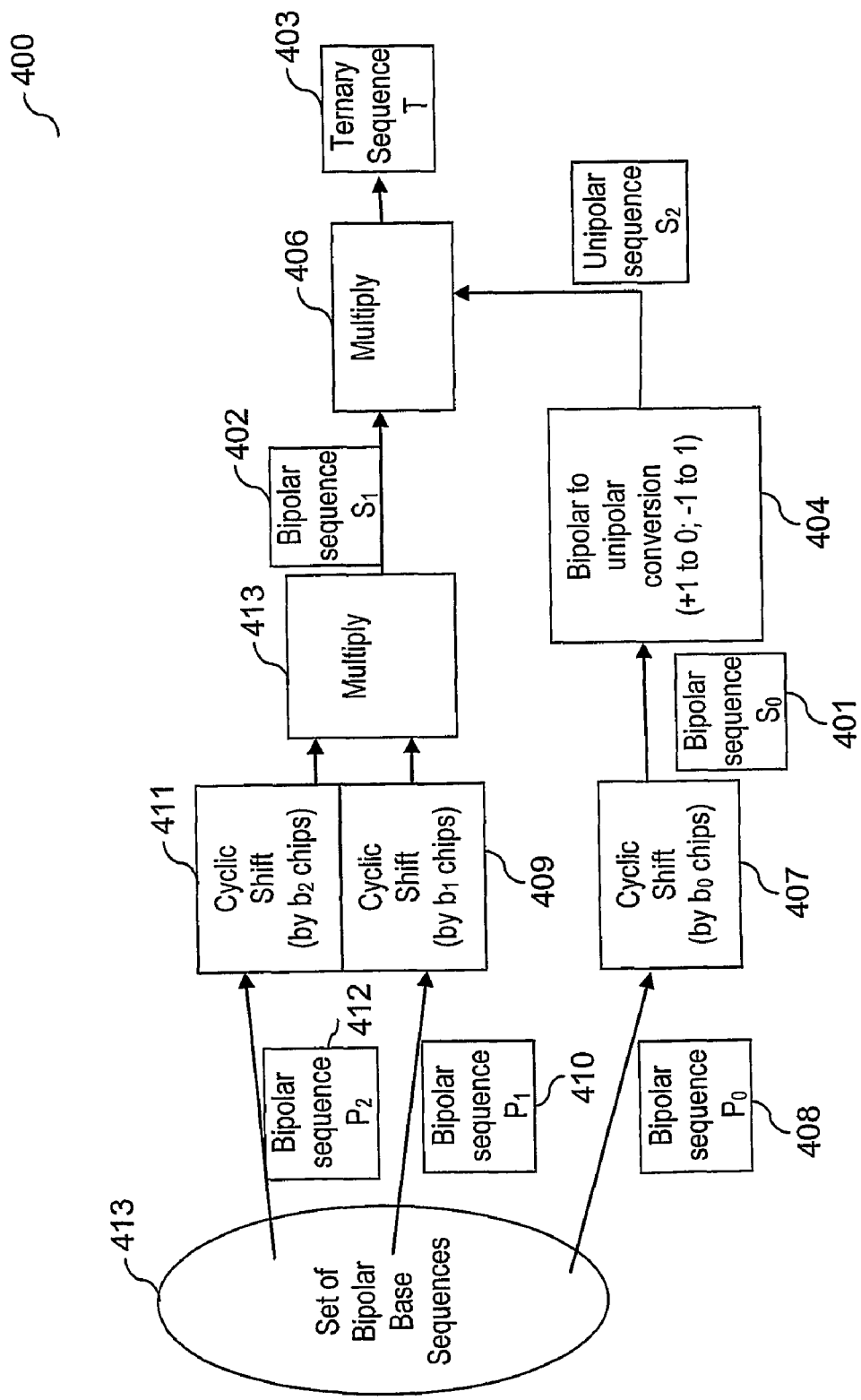
FIG. 4 shows a code sequence generator according to an embodiment of the invention.

Another example for the generation of the first bipolar sequence 201 and the second bipolar sequence 202 is shown in FIG. 4.

FIG. 4 shows a code sequence generator 400 according to an embodiment of the invention.

Similar to the code sequence generator 200 shown in FIG. 2, the code sequence generator 400 comprises a converting circuit 404 and a first multiplying circuit 406 which generate a ternary sequence 403 which is the output code sequence from a first bipolar sequence 401 and a second bipolar sequence 402.

The code sequence generator 400 further comprises a first cyclic shift circuit 407 which cyclic-shifts a third bipolar sequence 408 to generate the first bipolar sequence 401.

Further, the code sequence generator 400 comprises a second cyclic shift circuit 409 which cyclic-shifts a fourth bipolar sequence 410 and a third cyclic shift circuit 411 which cyclic-shifts a fifth bipolar sequence 412. The cyclic-shifted fourth bipolar sequence 410 and the cyclic shifted bipolar sequence 412 are multiplied by a second multiplying circuit 413 to generate the second bipolar sequence 402.

The third bipolar sequence 408, the fourth bipolar sequence 410 and the fifth bipolar sequence 412 are for example code sequences from a set of N-chip bipolar base sequences 413.

As above, for example, the code sequences in the set of N-chip bipolar base sequences 413 are M-sequences (Maximal length sequences). In one embodiment, for each sequence in the set of N-chip bipolar base sequences 413 the sum of components equals to 1.

A code sequence generated according to embodiments of the invention has for example the following features
  zero cyclic auto-correlation properties in a coherent detector, that can detect the phase of received signals, when the code sequence is correlated with itself;
  zero cyclic auto-correlation properties in an energy detector, that can detect the amplitude of received signals, when the code sequence is correlated with a sequence in a set of bipolar base sequences (such as the third bipolar sequence 309, 408).

The zero cyclic auto-correlation property is a property of a sequence whereby a peak value is obtained when the components of the sequence are multiplied with itself and summed and zero is obtained when the sequence's components are multiplied and summed with the components of any possible cyclic-shifted (1 to N−1 chips) version of the sequence. In coherent detectors, the peak value is N. In energy detectors, the peak value is $(N+1)/2$.

Besides generating code sequences having perfect autocorrelation values for both coherent and energy detector in the receiver, the code sequences generators according to embodiments of the invention may be implemented with very low implementation cost in terms of memory usage, especially when the bipolar sequences used for generating the ternary sequence are M-sequences (Maximal length sequences).

A maximal length sequence can be generated by a L-stage shift register representing a primitive polynomial, where $N=2^L-1$. Therefore, in one embodiment, the bipolar sequences used for generating the ternary sequence are not stored in a memory, but are generated by shift-registers.

Figure 5:
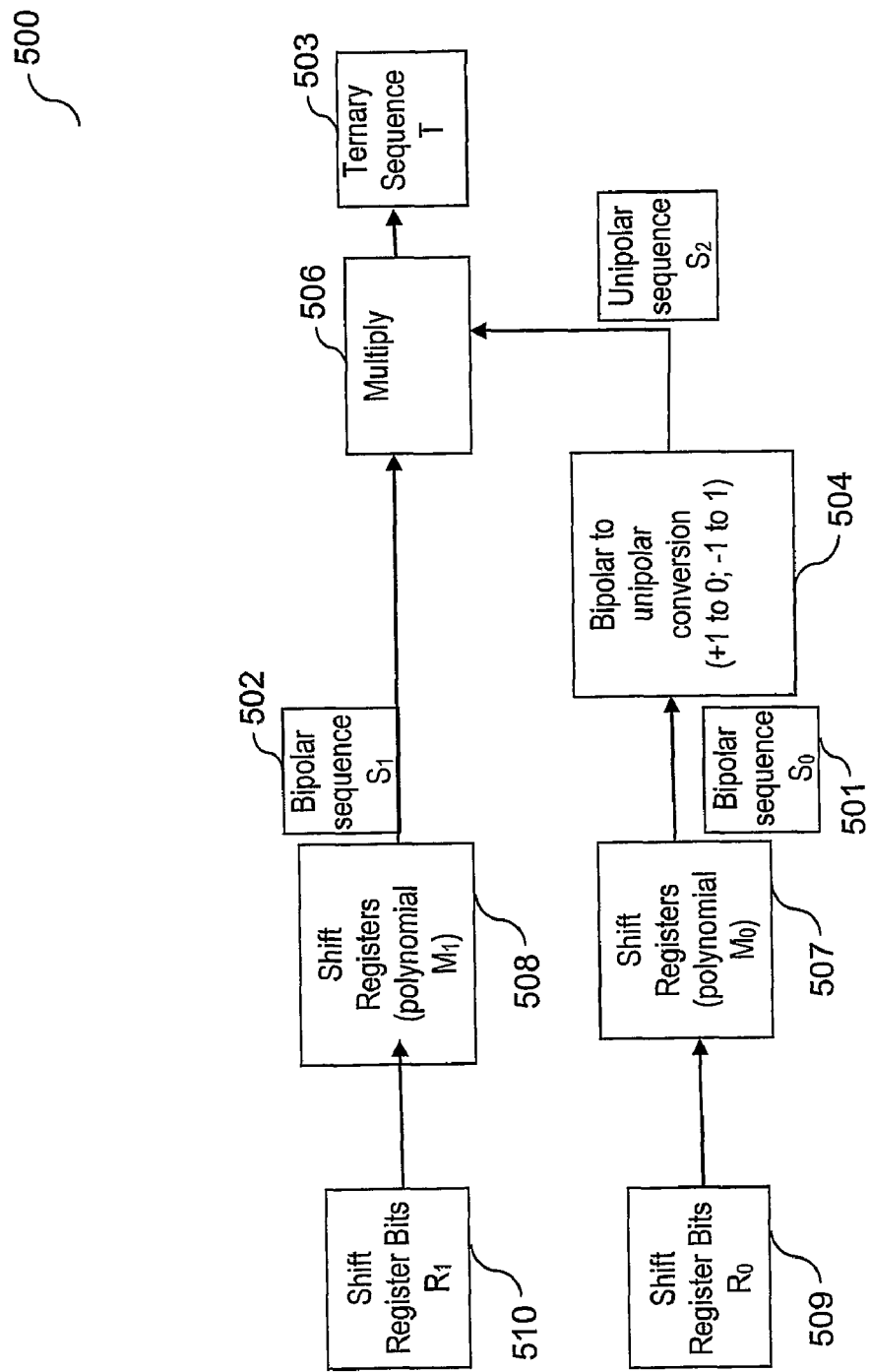
FIG. 5 shows a code sequence generator according to an embodiment of the invention.

For the code sequence generator 200 shown in FIG. 2 this is shown in FIG. 5.

FIG. 5 shows a code sequence generator 500 according to an embodiment of the invention.

Similar to the code sequence generator 200 shown in FIG. 2, the code sequence generator 500 comprises a converting circuit 504 and a multiplying circuit 506 which generate a ternary sequence 503 from a first bipolar sequence 501 and a second bipolar sequence 502.

The code sequence generator 500 further comprises a first shift register 507 and a second shift register 508. The first shift register 507 is characterized by a first polynomial denoted by M0, receives a first plurality of shift register bits 509 as input and generates the first bipolar sequence 501.

The second shift register 508 is characterized by a second polynomial denoted by M1, receives a second plurality of shift register bits 510 as input and generates the second bipolar sequence 502.

Only the first polynomial, the second polynomial, the first plurality of register bits 509 and the second plurality of register bits 510 need to be stored. In case of N=127 a memory saving factor of 7 can be achieved compared to the storage of the bipolar sequences 501, 502.

Figure 6:
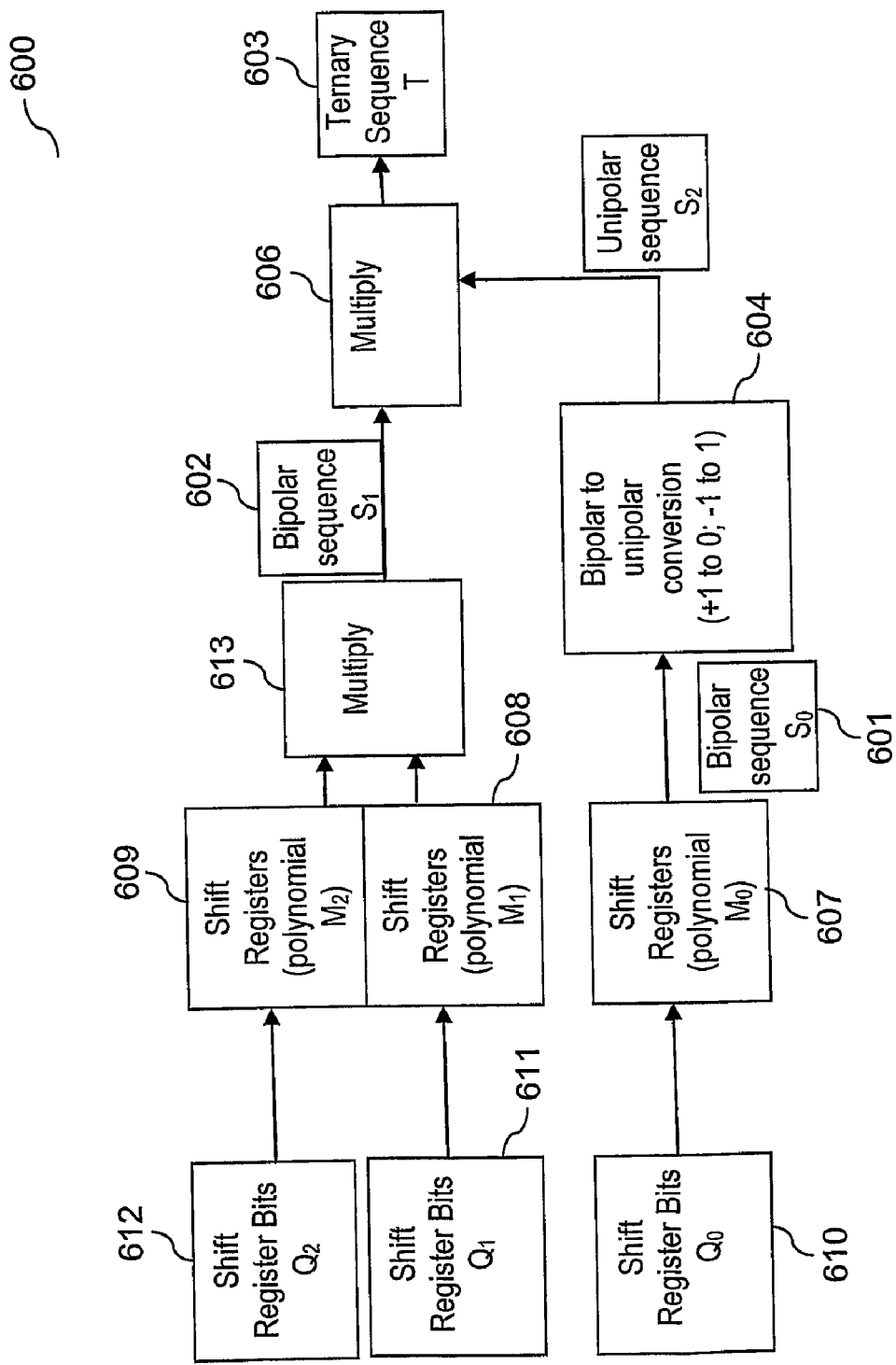
FIG. 6 shows a code sequence generator according to an embodiment of the invention.

Another example for generating the bipolar sequences 201, 202 using shift registers is shown in FIG. 6.

FIG. 6 shows a code sequence generator 600 according to an embodiment of the invention.

Similar to the code sequence generator 200 shown in FIG. 2, the code sequence generator 600 comprises a converting circuit 604 and a first multiplying circuit 606 which generate a ternary sequence 603 from a first bipolar sequence 601 and a second bipolar sequence 602.

The code sequence generator 600 further comprises a first shift register 607, a second shift register 608, and a third shift register 609. The first shift register 607 is characterized by a first polynomial denoted by M0, receives a first plurality of shift register bits 610 as input and generates the first bipolar sequence 601.

The second shift register 608 is characterized by a second polynomial denoted by M1 and receives a second plurality of shift register bits 611 as input. The third shift register 609 is characterized by a third polynomial denoted by M2 and receives a third plurality of shift register bits 612 as input.

The output of the second shift register 608 and the output of the third shift register 609 is multiplied (symbol-wise) by a second multiplying circuit 613 to generate the second bipolar sequence 602.

In case of N=127 a memory saving factor of 5 can be achieved compared to the storage of the bipolar sequences 601, 602.

Possible implementations of the shift registers are explained with reference to FIGS. 7 and 8 in the following.

Figure 7:
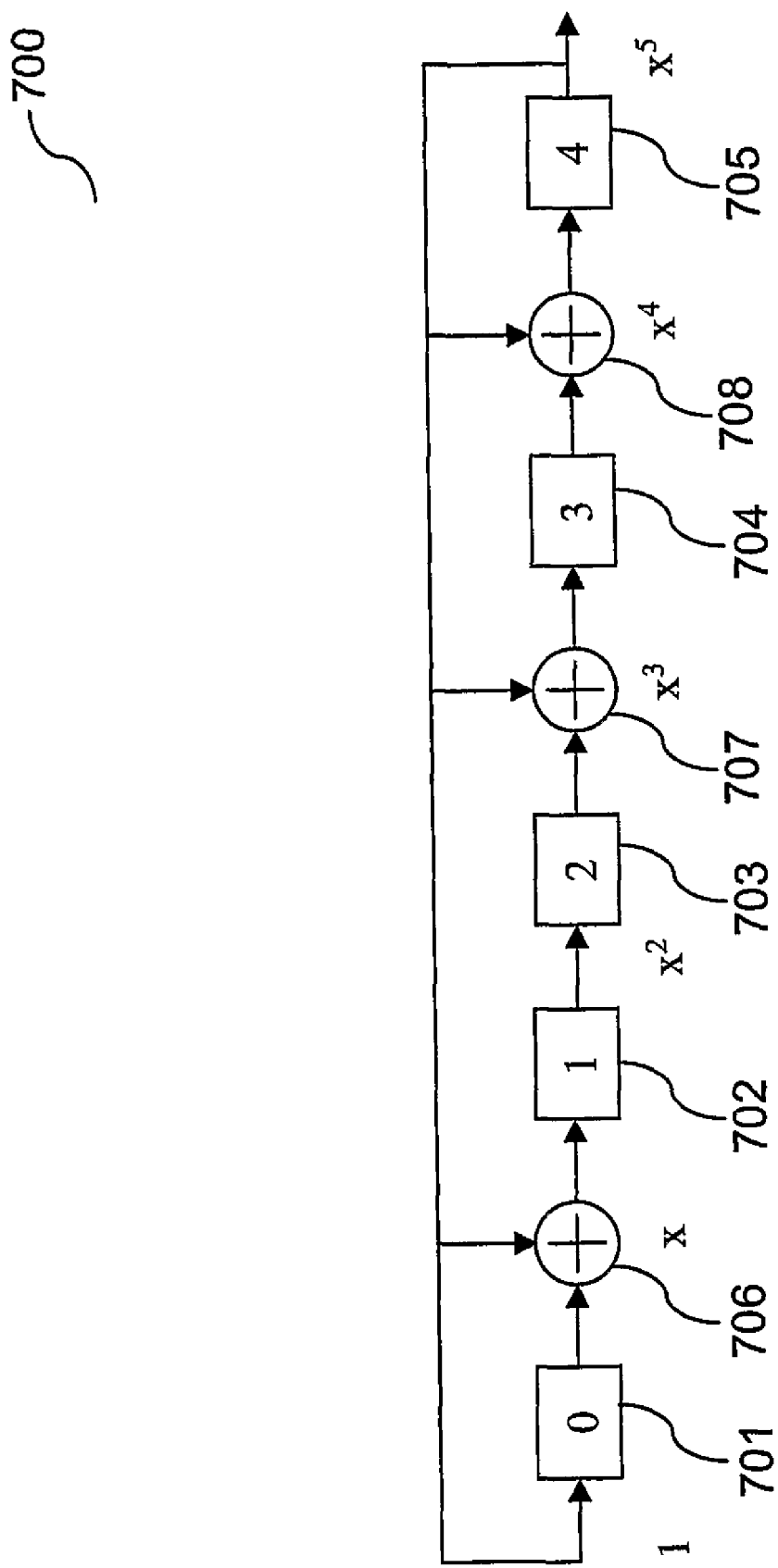
FIG. 7 shows a shift register according to an embodiment of the invention.

FIG. 7 shows a shift register 700 according to an embodiment of the invention.

The shift register 700 is a five-stage shift register and comprises a first stage 701, a second stage 702, a third stage 703, a fourth stage 704 and a fifth stage 705 which are numbered from 0 to 4.

The stages 701 to 705 are serially coupled. This means that the output of the first stage 701 is coupled to the input of the second stage 702 (by means of a first adding circuit 706), the output of the second stage 702 is coupled to the input of the third stage 702, the output of the third stage 703 is coupled to the input of the fourth stage 704 (by means of a second adding circuit 707) and the output of the fourth stage 704 is coupled to the input of the fifth stage 705 (by means of a third adding circuit 708). The output of the fifth stage 705 is the output of the shift register 700.

In addition, the output of the fifth stage 705 is coupled to the input of the first stage 701, to the input of the second stage 702 by means of the first adding circuit 706, to the input of the fourth stage 704 by means of the second adding circuit 707, and to the input of the fifth stage 705 by means of the third adding circuit 708.

As mentioned above, a shift register may be characterized by a polynomial. In this example, the shift register 700 may be characterized by the polynomial $1+X+X^3+X^4+X^5$ or equivalently by the vector of coefficients of this polynomial, i.e., 110111 (starting with the coefficient of $X^0$). In this example, the coefficient vector characterizes the shift register 700 according to the rule that if the ith coefficient is 1, the output of the fifth stage is coupled to the input of the stage number i. Hereby, i starts from 0, i.e. the ith coefficient is the coefficient of the ith power of X in the polynomial. The highest coefficient is ignored in this example. In this example, only the coefficient of $X^2$ is zero so the output of the fifth stage 705 is fed to all other stages but the third (stage number 2).

The input to the shift register 700, in the above example the register bits 509, 510, 609, 610, 611 are stored as initial values into the stages 701 to 705.

A stage is for example implemented as a flip-flop. The stages 701 to 705 are controlled by a clock signal (not shown) defining the time points at which the stages 701 to 705 store the respective input value (for example at each positive flank of the clock signal). With each positive flank of the clock signal, for example, the shift register 700 outputs a component (chip) of the respective generated code sequence.

Figure 8:
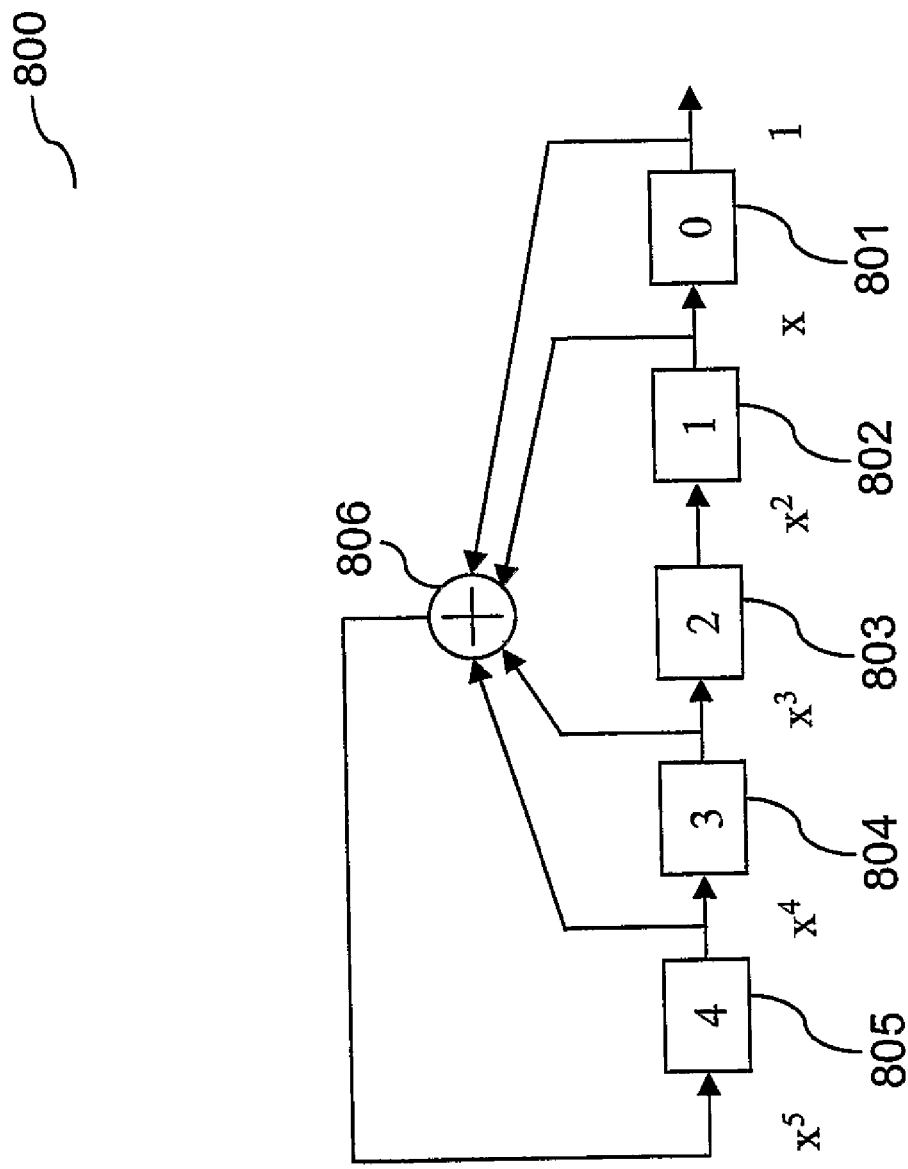
FIG. 8 shows a shift register according to an embodiment of the invention.

Another implementation of a shift register is shown in FIG. 8.

FIG. 8 shows a shift register 800 according to an embodiment of the invention.

The shift register 800 is a five-stage shift register and comprises a first stage 801, a second stage 802, a third stage 803, a fourth stage 804 and a fifth stage 805 which are numbered from 0 to 4 and which are serially connected, in reverse order with respect to the shift register 700 shown in FIG. 8. The output of the first stage 801 is the output of the shift register 800.

The shift register 800 may, as the shift register 700 in FIG. 7, be characterized by the polynomial $1+X+X^3+X^4+X^5$ or equivalently by the vector of coefficients of this polynomial 110111. In this example, the coefficient vector characterizes the shift register 800 according to the rule that the output of the stage with number i is fed to an adding circuit 802 the output of which is the input of the fifth shift register 805.

In the above embodiments, a ternary code sequence was generated starting from bipolar sequences. In the following, embodiments are described where a ternary code sequence is generated starting from unipolar sequences.

Figure 9:
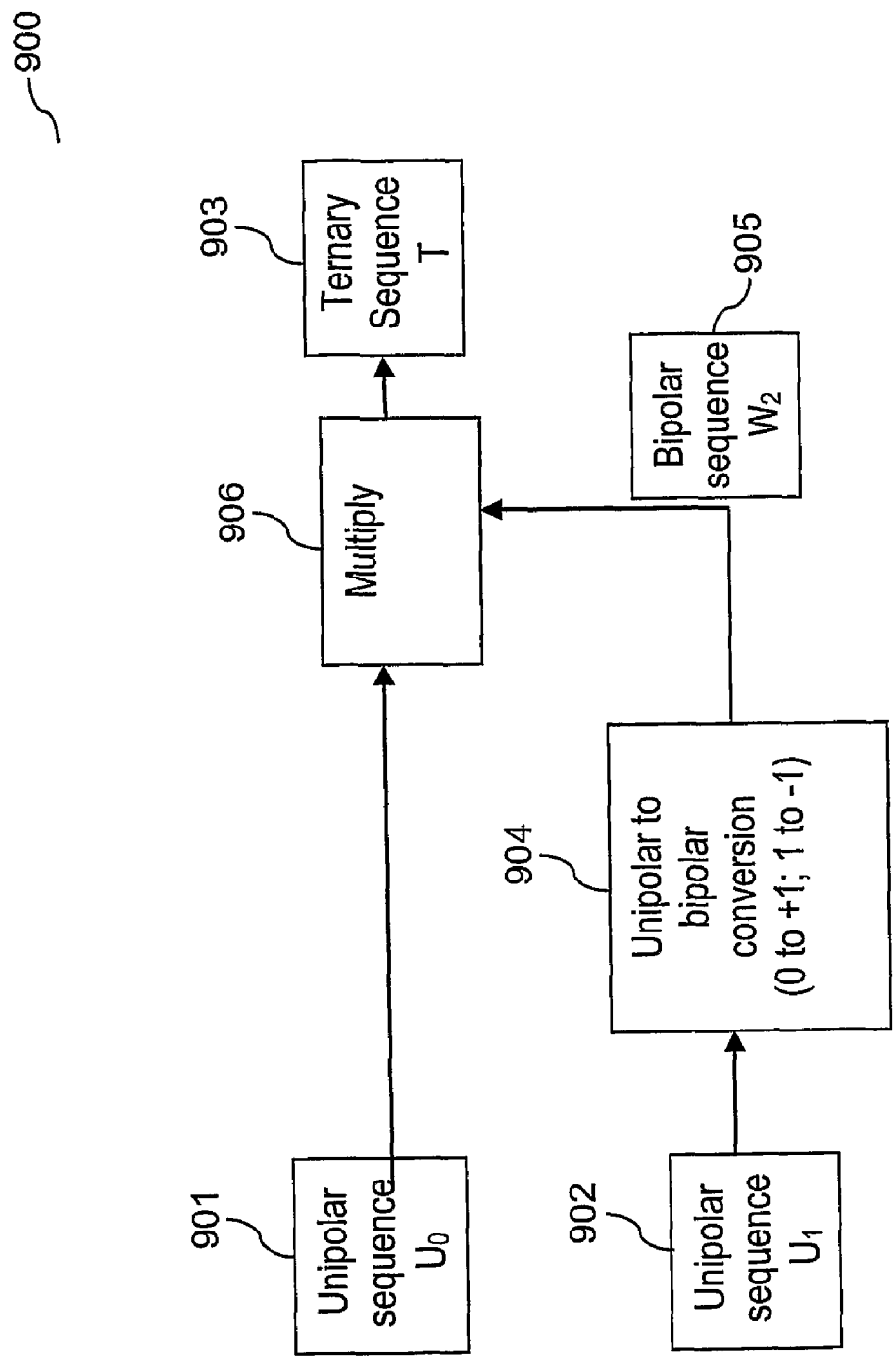
FIG. 9 shows a code sequence generator according to an embodiment of the invention.

FIG. 9 shows a code sequence generator 900 according to an embodiment of the invention.

The code generator 900 uses a first unipolar sequence 901 and a second unipolar sequence 902 to generate a ternary sequence 903 which is the output code sequence and is for example passed to the baseband pulse generator 103.

The first unipolar sequence 901 is converted by a converting circuit 904 to a bipolar sequence 905. The converting circuit 904 maps a 0 to a +1 and a +1 to a −1. The bipolar sequence 905 is multiplied symbol-wise, i.e. component-wise, with the second unipolar sequence 902 by a multiplying circuit 906. The result of the multiplication is the ternary sequence 903.

Figure 10:
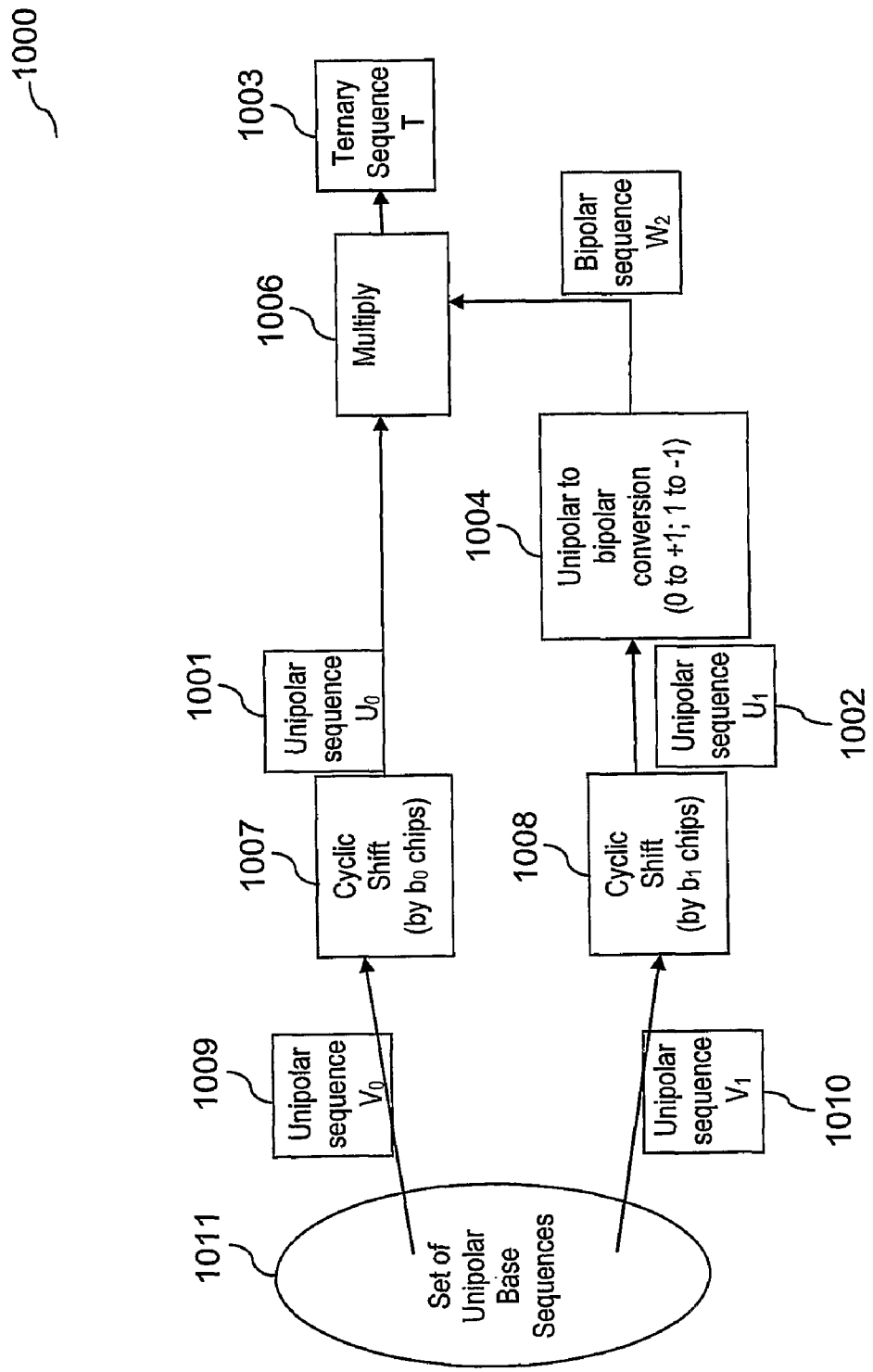
FIG. 10 shows a code sequence generator according to an embodiment of the invention.

The first unipolar sequence 901 and the second unipolar sequence 902 are for example generated as shown in FIG. 10.

FIG. 10 shows a code sequence generator 1000 according to an embodiment of the invention.

Similar to the code sequence generator 900 shown in FIG. 9, the code sequence generator 1000 comprises a converting circuit 1004 and a multiplying circuit 1006 which generate a ternary sequence 1003 which is the output code sequence from a first unipolar sequence 1001 and a second unipolar sequence 1002.

The code sequence generator 1000 further comprises a first cyclic shift circuit 1007 which cyclic-shifts (by a number of bits $b_0$) a third unipolar sequence 1009 to generate the first unipolar sequence 1001.

The code sequence generator 1000 further comprises a second cyclic shift circuit 1008 which cyclic-shifts (by a number of bits $b_1$) a fourth unipolar sequence 1010 to generate the second unipolar sequence 1002.

The third unipolar sequence 1009 and the fourth unipolar sequence 1010 are for example code sequences from a set of N-chip unipolar base sequences 1011.

For example, the code sequences in the set of N-chip unipolar base sequences 1011 are M-sequences (Maximal length sequences). In one embodiment, for each sequence in the set of N-chip unipolar base sequences 1011 the sum of components equals to 1.

Figure 11:
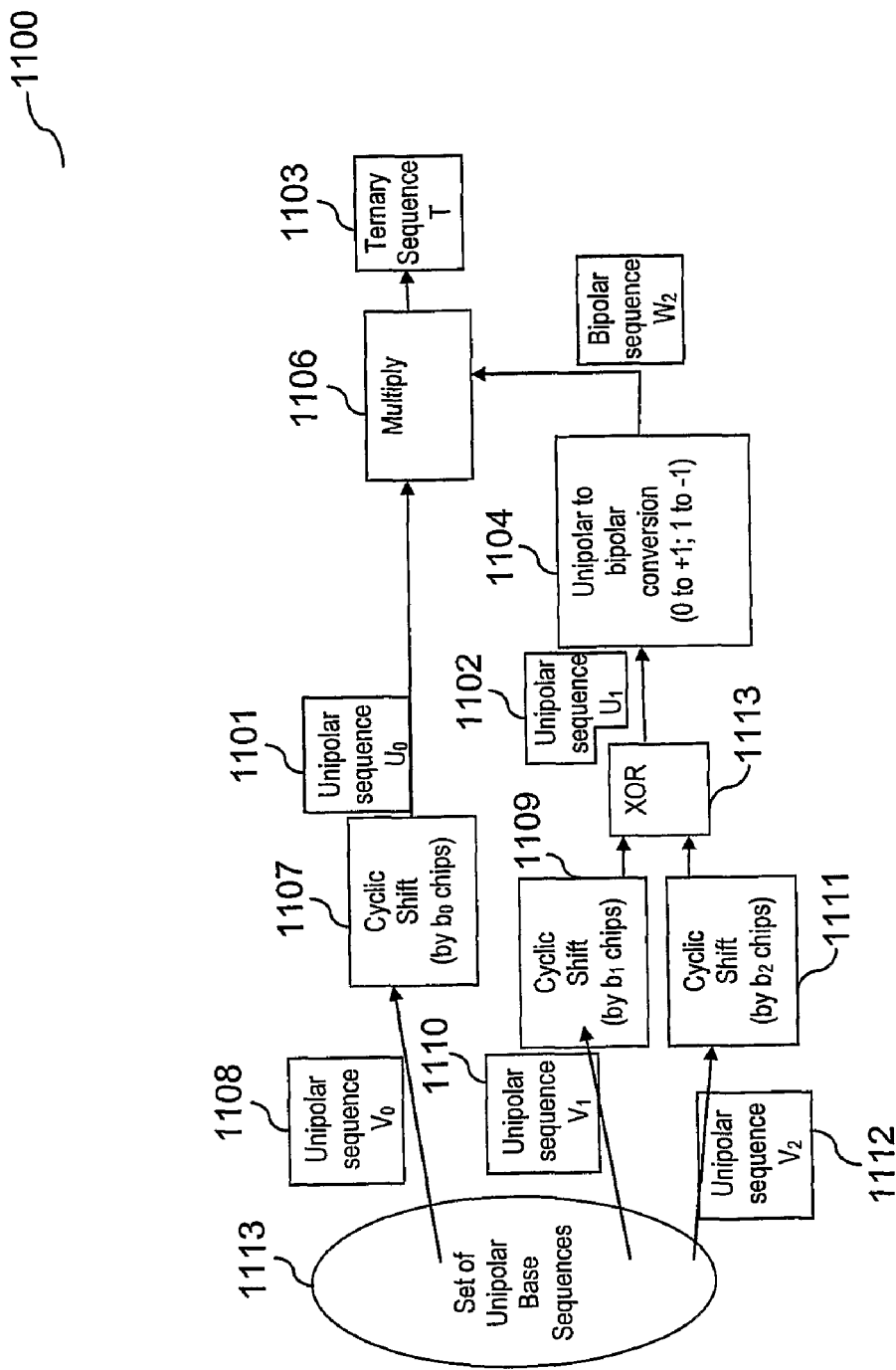
FIG. 11 shows a code sequence generator according to an embodiment of the invention.

Another example for the generation of the first unipolar sequence 201 and the second unipolar sequence 202 is shown in FIG. 11.

FIG. 11 shows a code sequence generator 1100 according to an embodiment of the invention.

Similar to the code sequence generator 900 shown in FIG. 9, the code sequence generator 1100 comprises a converting circuit 1104 and a multiplying circuit 1106 which generate a ternary sequence 1103 from a first unipolar sequence 1101 and a second unipolar sequence 1102.

The code sequence generator 1100 further comprises a first cyclic shift circuit 1107 which cyclic-shifts a third unipolar sequence 1108 to generate the first unipolar sequence 1101.

Further, the code sequence generator 1100 comprises a second cyclic shift circuit 1109 which cyclic-shifts a fourth unipolar sequence 1110 and a third cyclic shift circuit 1111 which cyclic-shifts a fifth unipolar sequence 1112. The cyclic-shifted fourth unipolar sequence 1110 and the cyclic shifted unipolar sequence 1112 are combined by a XOR circuit 1113 performing a component-wise XOR operation to generate the second unipolar sequence 1102.

The third unipolar sequence 1108, the fourth unipolar sequence 1110 and the fifth unipolar sequence 1112 are for example code sequences from a set of N-chip unipolar base sequences 1113.

As above, for example, the code sequences in the set of N-chip unipolar base sequences 1113 are M-sequences (Maximal length sequences). In one embodiment, for each sequence in the set of N-chip unipolar base sequences 1113 the sum of components equals to 1.

Similar to FIGS. 5 and 6, the unipolar sequences used to generate the ternary sequence may be generated using shift registers. This is illustrated in FIGS. 12 and 13.

Figure 12:
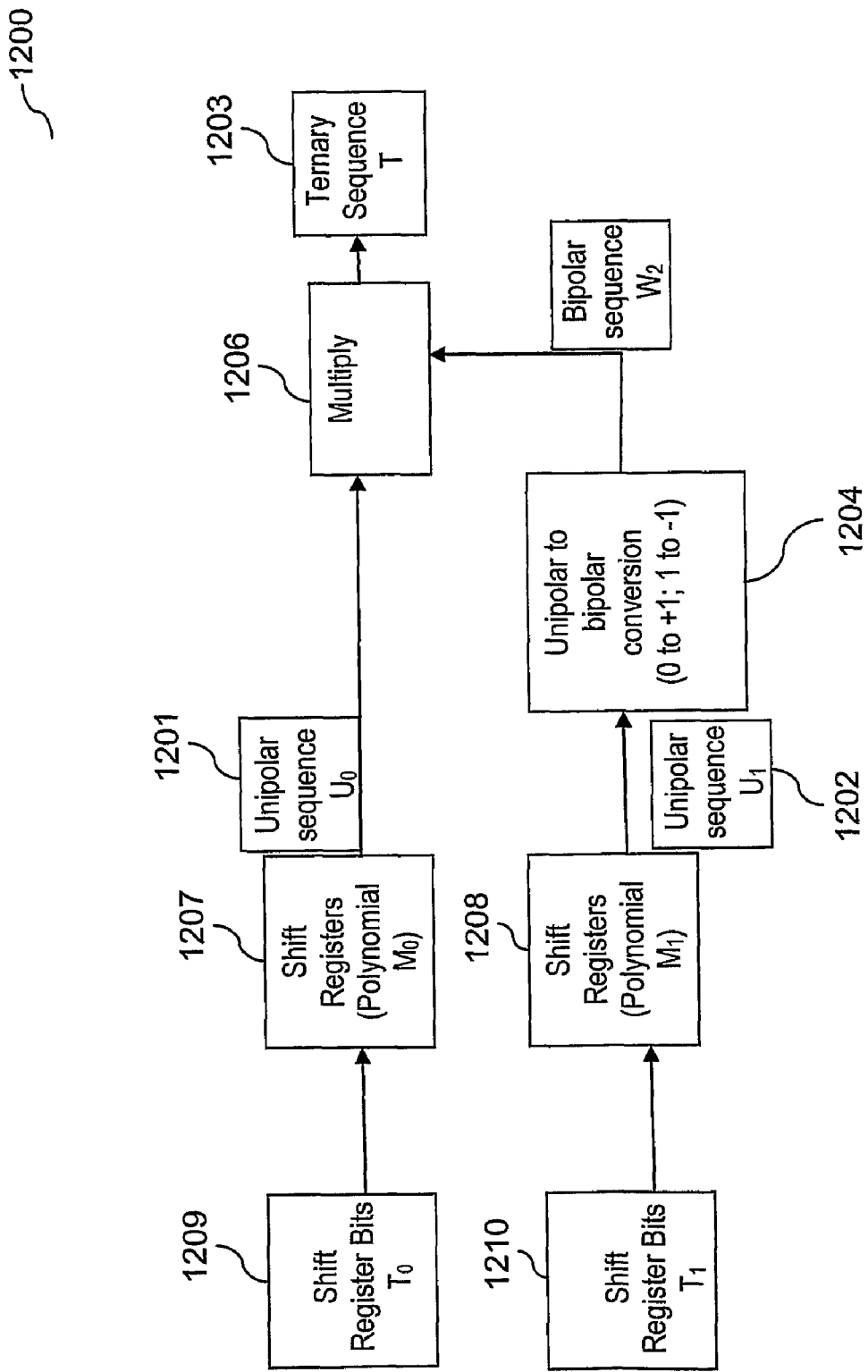
FIG. 12 shows a code sequence generator according to an embodiment of the invention.
Figure 13:
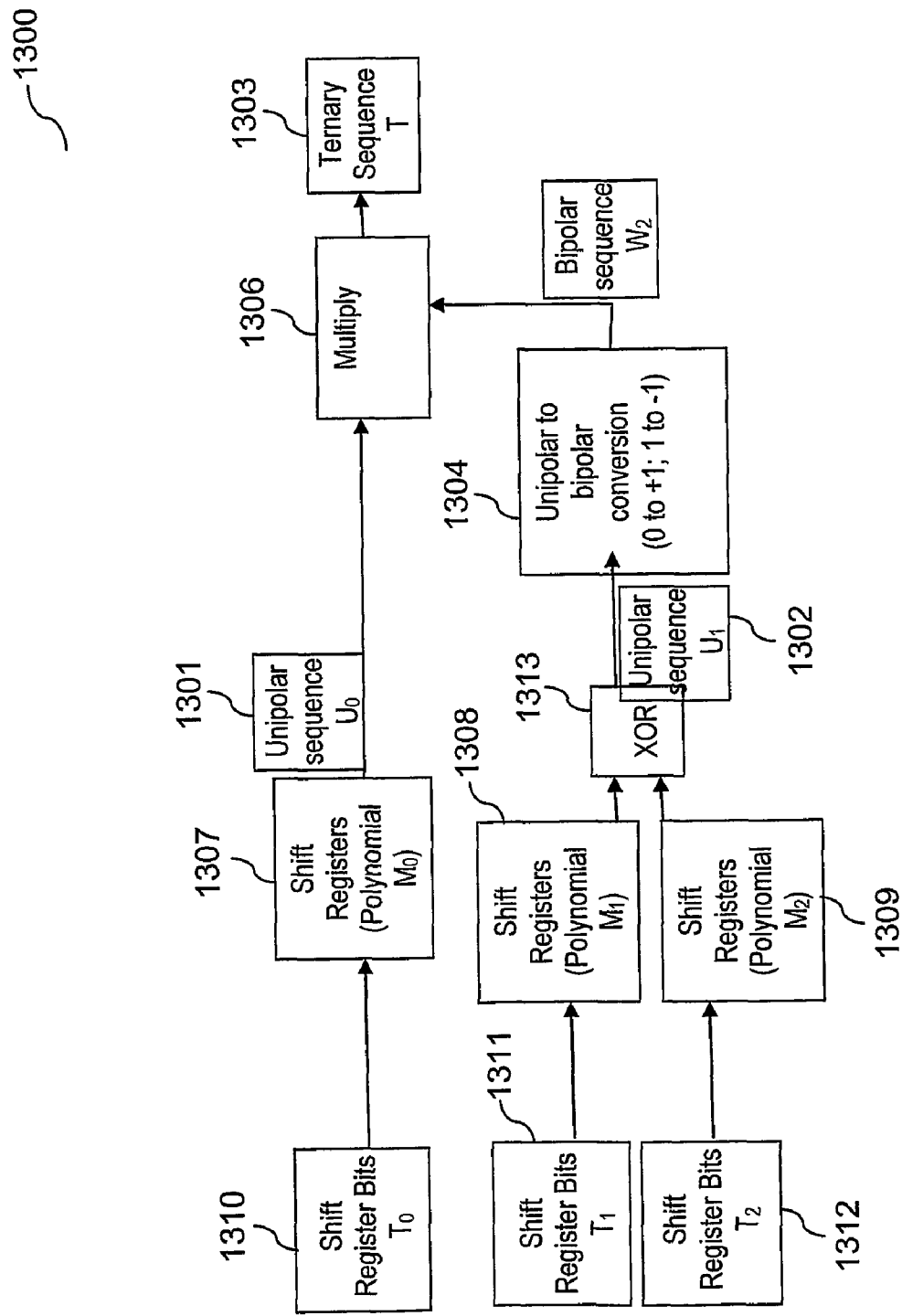
FIG. 13 shows a code sequence generator according to an embodiment of the invention.

FIG. 12 shows a code sequence generator 1200 according to an embodiment of the invention.

Similar to the code sequence generator 900 shown in FIG. 9, the code sequence generator 1200 comprises a converting circuit 1204 and a multiplying circuit 1206 which generate a ternary sequence 1203 from a first unipolar sequence 1201 and a second unipolar sequence 1202.

The code sequence generator 1200 further comprises a first shift register 1207 and a second shift register 1208. The first shift register 1207 is characterized by a first polynomial denoted by M0, receives a first plurality of shift register bits 1209 as input and generates the first unipolar sequence 1201.

The second shift register 1208 is characterized by a second polynomial denoted by M1, receives a second plurality of shift register bits 1210 as input and generates the second unipolar sequence 1202.

Another example for generating the unipolar sequences 901, 902 using shift registers is shown in FIG. 13.

FIG. 13 shows a code sequence generator 1300 according to an embodiment of the invention.

Similar to the code sequence generator 900 shown in FIG. 9, the code sequence generator 1300 comprises a converting circuit 1304 and a multiplying circuit 1306 which generate a ternary sequence 1303 from a first unipolar sequence 1301 and a second unipolar sequence 1302.

The code sequence generator 130Q further comprises a first shift register 1307, a second shift register 1308, and a third shift register 1309. The first shift register 1307 is characterized by a first polynomial denoted by M0, receives a first plurality of shift register bits 1310 as input and generates the first unipolar sequence 1301.

The second shift register 1308 is characterized by a second polynomial denoted by M1 and receives a second plurality of shift register bits 1311 as input. The third shift register 1309 is characterized by a third polynomial denoted by M2 and receives a third plurality of shift register bits 1312 as input.

The output of the second shift register 1308 and the output of the third shift register 1309 are combined by an XOR 1313 circuit which performs a symbol-wise XOR operation to generate the second unipolar sequence 1302.

The shift registers may be implemented as is explained with reference to FIGS. 7 and 8.

In the following, an example is given for the generation of ternary sequences.

Figure 14:
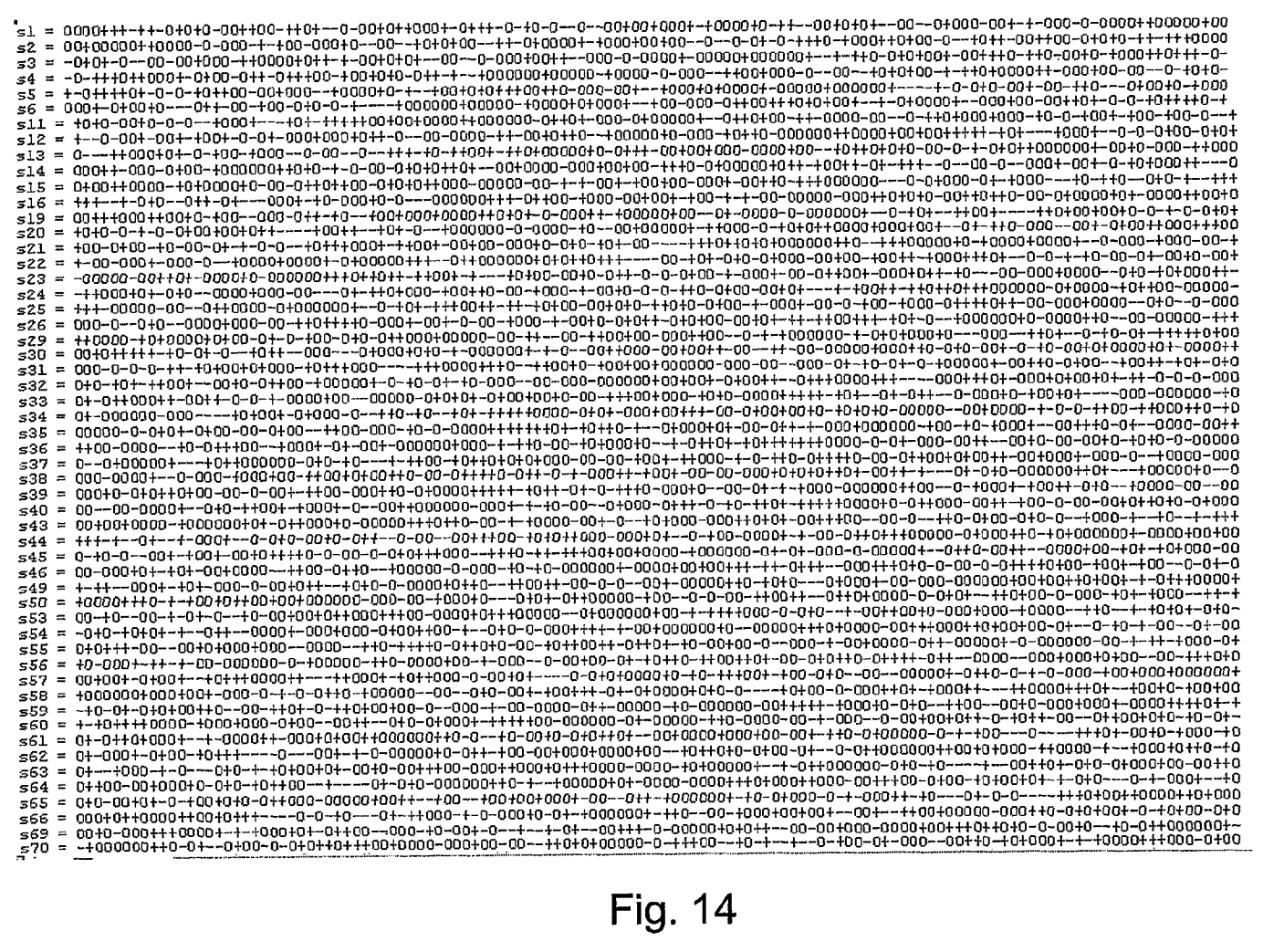

FIG. 14 shows ternary code sequences according to an embodiment of the invention.

In FIG. 14, 54 127-chip perfect balanced ternary sequences are shown, having components +1 (indicated by a '+' in FIG. 14), −1 (indicated by a '−' in FIG. 14) and 0 and labelled s1 to s70 (wherein some numbers between 1 and 70 are omitted). The code sequences have zero cyclic auto-correlation properties in both a coherent detector and an energy detector for perfect synchronization, ranging a channel estimation purposes for impulse radio.

The code sequences shown in FIG. 14 are also referred to as PBTSs (perfect balance ternary sequences). The generation of the PBTSs is explained in the following.

Figure 15:
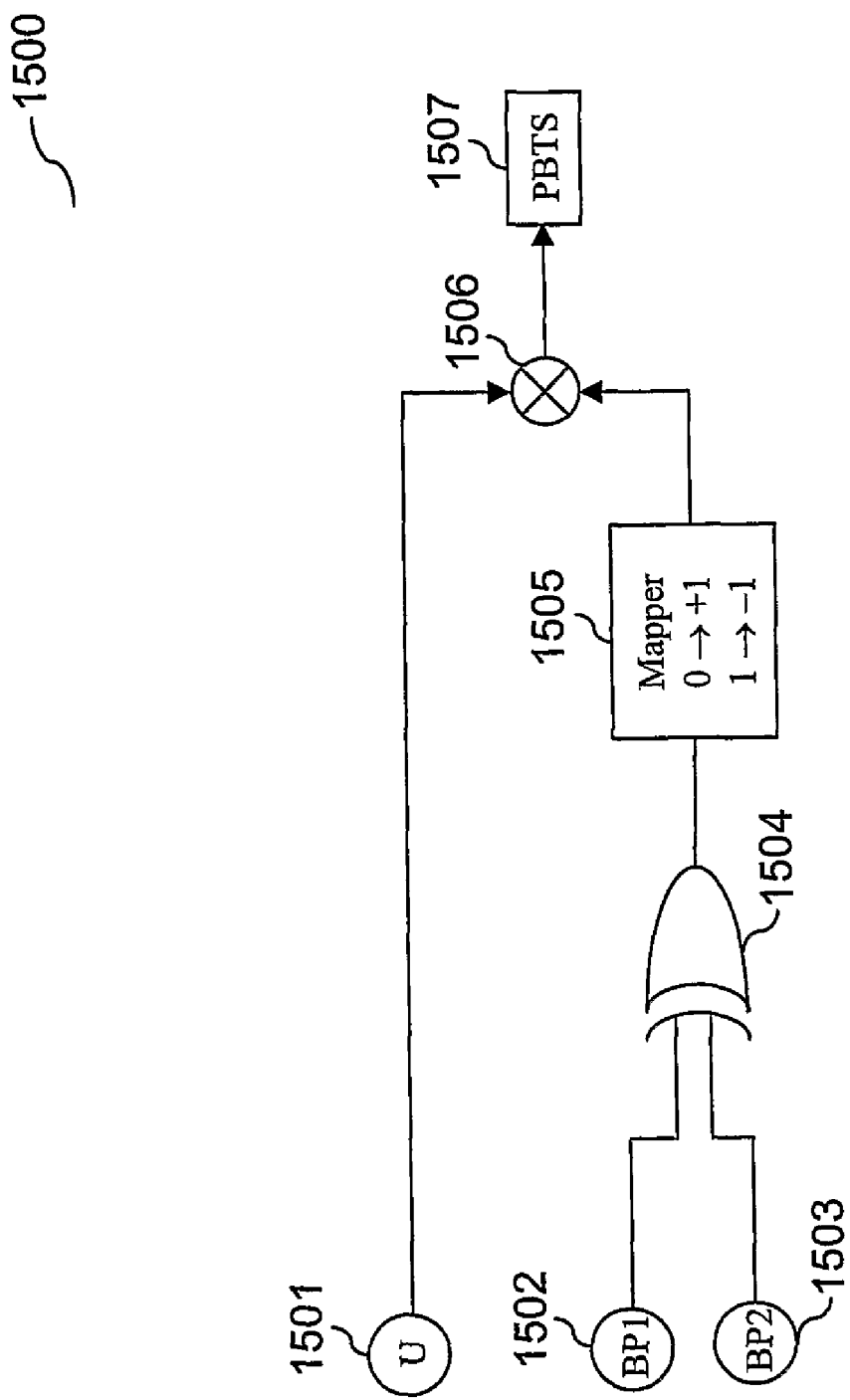
FIG. 15 shows a code generator according to an embodiment of the invention.

FIG. 15 shows a code generator 1500 according to an embodiment of the invention.

The code generator 1500 comprises a unipolar sequence source 1501 providing an unipolar sequence, a second unipolar sequence source 1502 providing a second unipolar sequence, and a third unipolar sequence source 1503 providing a third unipolar sequence.

The second unipolar sequence and the third unipolar sequence are combined by an XOR circuit 1504 according to a component-wise XOR operation. The resulting unipolar sequence is transformed into a bipolar sequence by a converting circuit 1505. The first unipolar sequence and the bipolar sequence are multiplied by a multiplying circuit 1506 generating one a code sequence (PTBS) 1507.

Each of the unipolar sequence sources is for example implemented by a shift register. In one embodiment, the shift registers used are implemented as has been described with reference to FIG. 7 wherein in this example, shift registers with seven stages are used, i.e., L=7.

The shift registers used in this embodiment are generic in the sense that they can receive a coefficient vector and the feedback of the output of the last stage to the inputs of the other stages is set as defined by the coefficient vector as described with reference to FIG. 7. In addition, each shift register receives a plurality of shift register bits (initial value vectors) defining the initial values of the stages.

In this embodiment, since there are three unipolar sequence sources each being implemented by a shift register, six inputs (3 coefficient vectors, 3 initial value vectors) are required.

In this example, each coefficient vector is an eight bit vector and each initial value vector is a seven bit vector. Since these vectors can also be interpreted as binary numbers (read from left right in this example, i.e. the leftmost bit being the least significant bit and the rightmost bit being the most significant bit) the coefficient vectors and initial value vectors can also be written as decimal numbers.

In Table 1, the required six inputs are shown for each of the PBTSs (wherein more than one possibility may be shown for one sequence). Therein, the coefficient vector to be supplied to the first sequence source 1501 is in the column labelled polynomial 1, the coefficient vector to be supplied to the second sequence source 1502 is in the column labelled polynomial 2, and the coefficient vector to be supplied to the third sequence source 1503 is in the column labelled polynomial 3. The initial value vector (also denoted as seed) to be supplied to the first sequence source 1501 is in the column labelled seed 1, the initial value vector to be supplied to the second sequence source 1502 is in the column labelled seed 2, and the initial value vector to be supplied to the third sequence source 1503 is in the column labelled seed 3.

TABLE 1

| PBTS Number | Polynomial 1 | Seed 1 | Polynomial 2 | Seed 2 | Polynomial 3 | Seed 3 |
|---|---|---|---|---|---|---|
| 1 | 193 | 4 | 241 | 5 | 213 | 4 |
| 2 | 131 | 16 | 171 | 16 | 143 | 80 |
| 3 | 193 | 125 | 241 | 32 | 157 | 115 |
| 4 | 131 | 95 | 185 | 103 | 143 | 2 |
| 5 | 193 | 88 | 213 | 57 | 157 | 8 |
| 5 | 193 | 88 | 211 | 118 | 191 | 96 |
| 6 | 131 | 13 | 185 | 8 | 171 | 78 |
| 6 | 131 | 13 | 253 | 3 | 203 | 55 |
| 11 | 191 | 77 | 145 | 96 | 241 | 118 |
| 11 | 191 | 77 | 131 | 37 | 211 | 55 |
| 12 | 253 | 89 | 193 | 82 | 203 | 118 |
| 12 | 253 | 89 | 137 | 3 | 143 | 55 |
| 13 | 247 | 40 | 145 | 12 | 131 | 52 |
| 14 | 239 | 10 | 193 | 22 | 137 | 24 |
| 15 | 211 | 49 | 137 | 4 | 131 | 4 |
| 16 | 203 | 70 | 193 | 16 | 145 | 16 |
| 19 | 213 | 17 | 157 | 29 | 253 | 23 |
| 20 | 171 | 68 | 185 | 92 | 191 | 116 |
| 21 | 229 | 127 | 241 | 103 | 171 | 95 |
| 22 | 167 | 127 | 213 | 125 | 143 | 115 |
| 23 | 213 | 107 | 253 | 18 | 239 | 65 |
| 24 | 171 | 107 | 247 | 65 | 191 | 36 |
| 25 | 213 | 72 | 157 | 49 | 239 | 46 |
| 25 | 213 | 72 | 131 | 74 | 211 | 110 |
| 26 | 171 | 9 | 193 | 41 | 203 | 59 |
| 26 | 171 | 9 | 185 | 70 | 247 | 58 |
| 29 | 211 | 92 | 241 | 47 | 253 | 43 |
| 29 | 211 | 92 | 131 | 64 | 171 | 64 |
| 30 | 203 | 29 | 193 | 1 | 213 | 1 |
| 30 | 203 | 29 | 143 | 122 | 191 | 106 |
| 31 | 137 | 10 | 157 | 54 | 143 | 29 |
| 32 | 145 | 40 | 241 | 92 | 185 | 54 |
| 33 | 241 | 38 | 253 | 55 | 247 | 37 |
| 34 | 143 | 50 | 239 | 82 | 191 | 118 |
| 35 | 241 | 3 | 203 | 11 | 247 | 63 |
| 36 | 143 | 96 | 211 | 104 | 239 | 126 |
| 37 | 167 | 56 | 137 | 18 | 143 | 102 |
| 37 | 167 | 56 | 185 | 126 | 247 | 21 |
| 38 | 229 | 14 | 145 | 36 | 241 | 51 |
| 38 | 229 | 14 | 157 | 63 | 239 | 84 |
| 39 | 241 | 12 | 137 | 66 | 167 | 106 |
| 39 | 241 | 12 | 253 | 37 | 203 | 44 |
| 40 | 143 | 24 | 145 | 33 | 229 | 43 |
| 40 | 143 | 24 | 211 | 26 | 191 | 82 |
| 43 | 191 | 21 | 131 | 1 | 167 | 5 |
| 44 | 253 | 84 | 193 | 64 | 229 | 80 |
| 45 | 191 | 60 | 211 | 22 | 167 | 50 |
| 46 | 253 | 30 | 229 | 38 | 203 | 52 |
| 49 | 145 | 113 | 241 | 33 | 253 | 25 |
| 49 | 145 | 113 | 167 | 122 | 239 | 114 |
| 50 | 137 | 71 | 229 | 47 | 247 | 39 |
| 50 | 137 | 71 | 143 | 66 | 191 | 76 |
| 53 | 157 | 25 | 131 | 93 | 171 | 38 |
| 53 | 157 | 25 | 167 | 68 | 239 | 59 |
| 54 | 185 | 76 | 193 | 93 | 213 | 50 |
| 54 | 185 | 76 | 229 | 17 | 247 | 110 |
| 55 | 157 | 41 | 203 | 52 | 239 | 32 |
| 56 | 185 | 74 | 211 | 22 | 247 | 2 |
| 57 | 145 | 17 | 185 | 17 | 253 | 85 |
| 58 | 137 | 68 | 157 | 68 | 191 | 85 |
| 59 | 157 | 99 | 203 | 23 | 167 | 69 |
| 60 | 185 | 99 | 229 | 81 | 211 | 116 |
| 61 | 239 | 34 | 137 | 44 | 167 | 48 |
| 61 | 239 | 34 | 185 | 65 | 171 | 95 |
| 62 | 247 | 34 | 145 | 26 | 229 | 6 |
| 62 | 247 | 34 | 213 | 125 | 157 | 65 |
| 63 | 167 | 50 | 137 | 61 | 213 | 89 |
| 64 | 229 | 38 | 145 | 94 | 171 | 77 |
| 65 | 211 | 56 | 137 | 57 | 171 | 42 |

TABLE 1-continued

| PBTS Number | Polynomial 1 | Seed 1 | Polynomial 2 | Seed 2 | Polynomial 3 | Seed 3 |
|---|---|---|---|---|---|---|
| 66 | 203 | 14 | 145 | 78 | 213 | 42 |
| 69 | 247 | 25 | 229 | 23 | 131 | 90 |
| 70 | 239 | 76 | 193 | 45 | 167 | 116 |

As an example, the generation of the PBTS number 1 is explained. From Table 1, one can see that the shift register implementing the first sequence source 1501 is characterized by 193 which is in binary representation 10000011 which is the coefficient vector of the polynomial characterizing the shift registers operation for this case.

Figure 16:
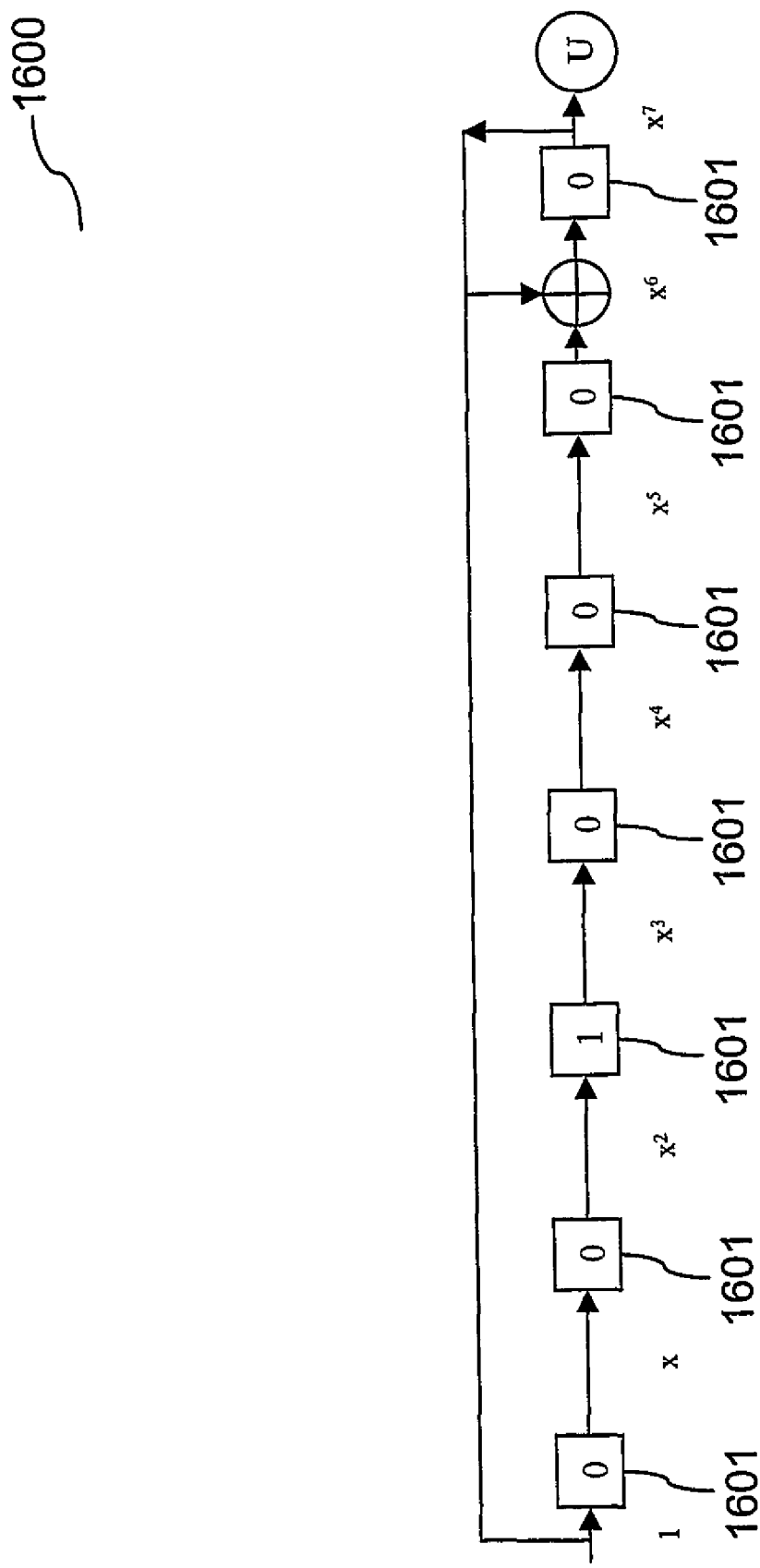
FIG. 16 shows a shift register according to an embodiment of the invention.

According to the rule described above with reference to FIG. 7, the shift register's structure is as shown in FIG. 16. There is feedback of the output to the first stage and seventh stage.

FIG. 16 shows a shift register 1600 according to an embodiment of the invention.

According to table one, the initial value of the shift register 1600 is given by 4, which is, in binary representation (with the leftmost bit being the least significant bit), the initial value vector 0010000. Initial values are stored in the stages 1601 of the shift register 1600 according to this initial value vector as shown in FIG. 16.

From Table 1, one further sees that the shift register implementing the second sequence source 1502 is characterized by 241 which is in binary representation 10001111 which is the coefficient vector of the polynomial characterizing the shift registers operation for this case.

Figure 17:
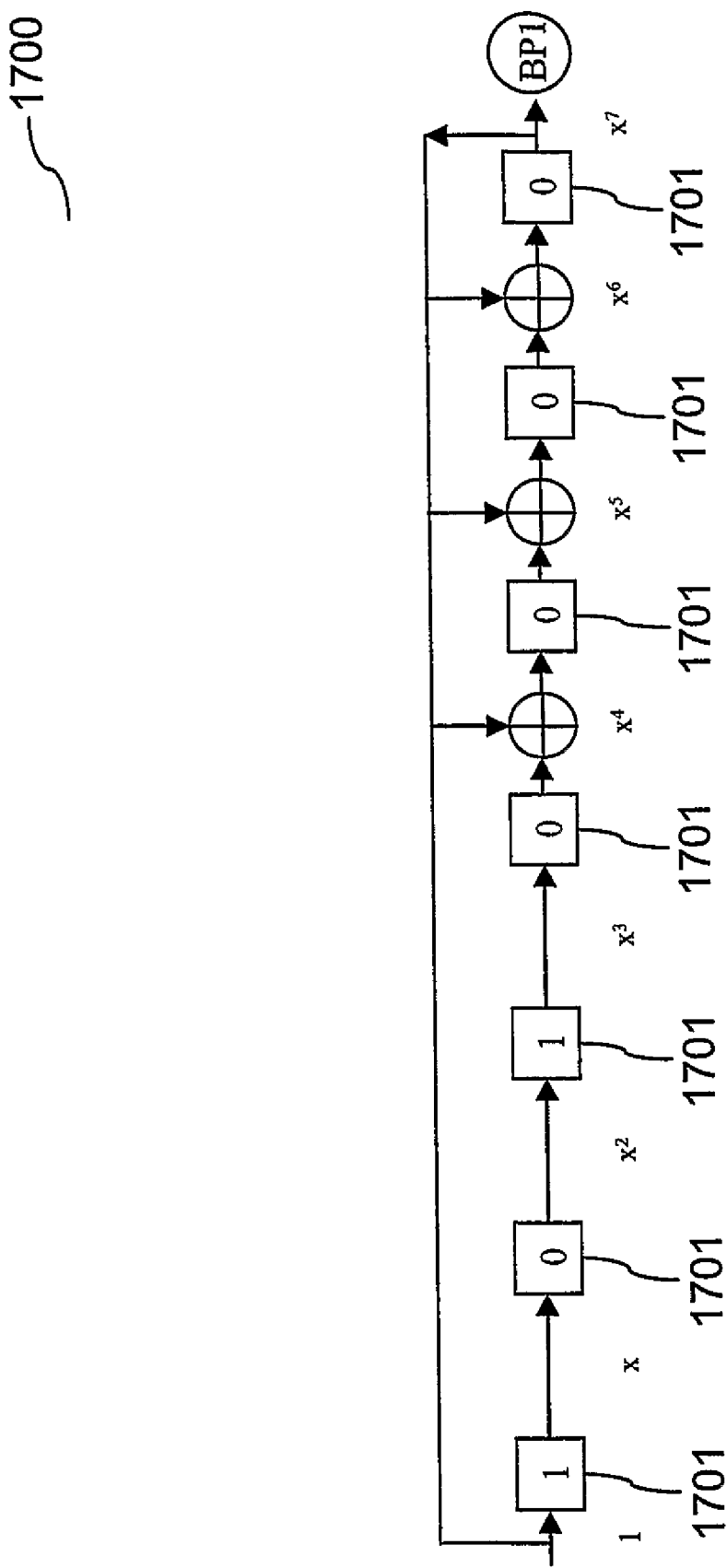
FIG. 17 shows a shift register according to an embodiment of the invention.

According to the rule described above with reference to FIG. 7, the shift register's structure is as shown in FIG. 17. There is feedback of the output to the first stage, the fifth stage, the sixth stage, and the seventh stage.

FIG. 17 shows a shift register 1700 according to an embodiment of the invention.

According to table one, the initial value of the shift register 1700 is given by 5, which is, in binary representation (with the leftmost bit being the least significant bit), the initial value vector 1010000. Initial values are stored in the stages 1701 of the shift register 1700 according to this initial value vector as shown in FIG. 17.

Furthermore, Table 1 shows that the shift register implementing the third sequence source 1502 is characterized by 213 which is in binary representation 10101011 which is the coefficient vector of the polynomial characterizing the shift registers operation for this case.

Figure 18:
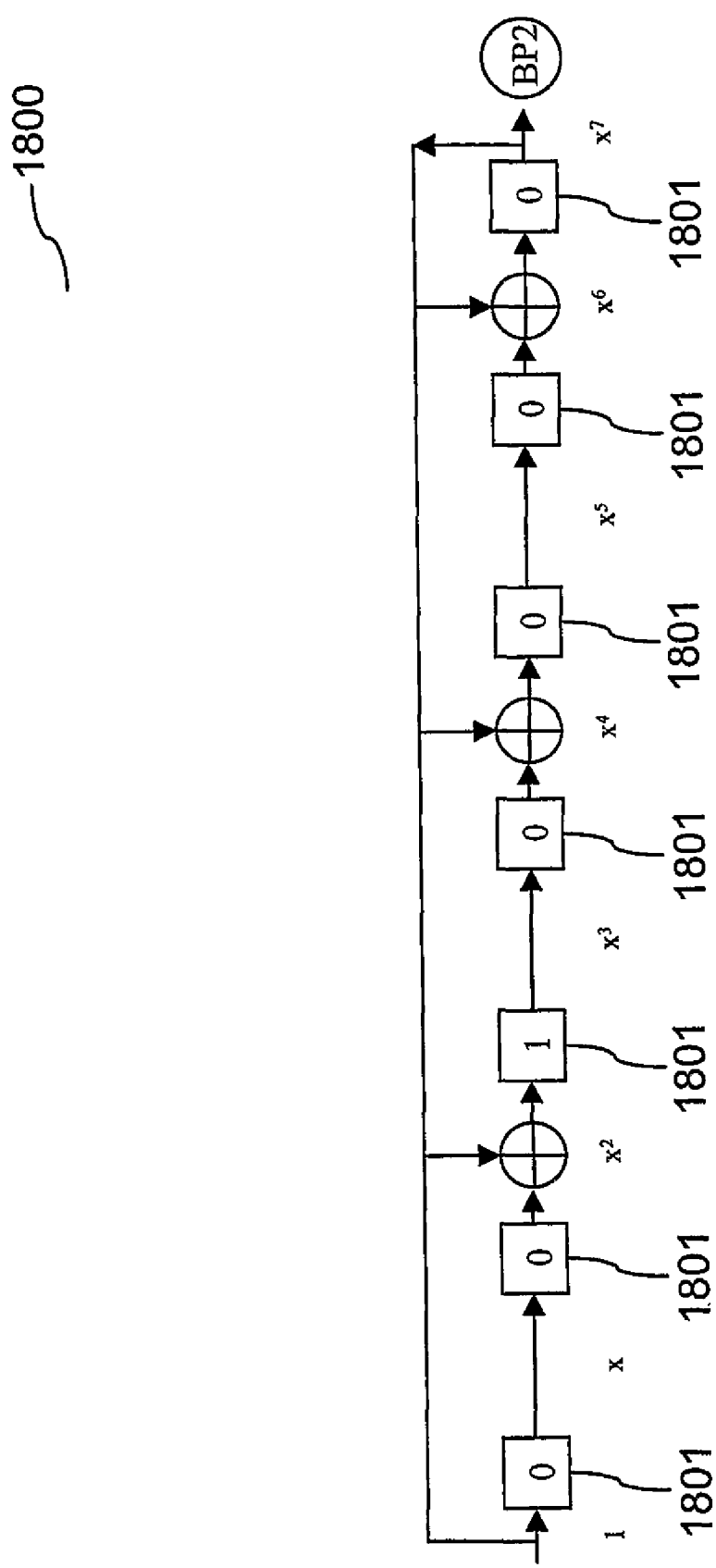
FIG. 18 shows a shift register according to an embodiment of the invention.

According to the rule described above with reference to FIG. 7, the shift register's structure is as shown in FIG. 18. There is feedback of the output to the first stage, the third stage, the fifth stage, and the seventh stage.

FIG. 18 shows a shift register 1800 according to an embodiment of the invention.

According to table one, the initial value of the shift register 1800 is given by 4, which is, in binary representation (with the leftmost bit being the least significant bit), the initial value vector 0010000. Initial values are stored in the stages 1801 of the shift register 1800 according to this initial value vector as shown in FIG. 18.

The phases of individual PBTS sequences may be cyclic shifted so that one of the three initial seed values can be fixed at a common value (1, for instance). In this case, the generation of a PBTS sequence only requires five inputs (since one value is fixed). Consequently, less values need to be stored and the memory requirement can be reduced further.

The invention claimed is:

1. A method for decompressing at least two two-valued symbol sequences into a three-valued communication sequence comprising:
   converting a first two-valued symbol sequence into an intermediate symbol sequence;
   symbol-wise multiplying the intermediate symbol sequence with the second two-valued symbol sequence to generate the three-valued communication sequence;
   wherein the first two-valued symbol sequence is a bipolar symbol sequence and the intermediate sequence is a unipolar sequence or the first two-valued symbol sequence is a unipolar symbol sequence and the intermediate sequence is a bipolar sequence.

2. A method for decompressing at least two two-valued symbol sequences into a three-valued communication sequence comprising:
   converting a first two-valued symbol sequence into an intermediate symbol sequence;
   symbol-wise multiplying the intermediate symbol sequence with the second two-valued symbol sequence to generate the three-valued communication sequence;
   wherein the three-valued communication sequence is a ternary sequence.

3. A method for decompressing at least two two-valued symbol sequences into a three-valued communication sequence comprising:
   converting a first two-valued symbol sequence into an intermediate symbol sequence;
   symbol-wise multiplying the intermediate symbol sequence with the second two-valued symbol sequence to generate the three-valued communication sequence;
   wherein the second two-valued symbol sequence is a bipolar symbol sequence or a unipolar symbol sequence.

4. A method for decompressing at least two two-valued symbol sequences into a three-valued communication sequence comprising:
   converting a first two-valued symbol sequence into an intermediate symbol sequence;
   symbol-wise multiplying the intermediate symbol sequence with the second two-valued symbol sequence to generate the three-valued communication sequence;
   wherein the three-valued communication sequence is to be transmitted from a transmitter to a receiver for the purpose of at least one of
   channel estimation
   ranging
   synchronization.

5. A method for decompressing at least two two-valued symbol sequences into a three-valued communication sequence comprising:
   converting a first two-valued symbol sequence into an intermediate symbol sequence;
   symbol-wise multiplying the intermediate symbol sequence with the second two-valued symbol sequence to generate the three-valued communication sequence; and
   generating the first two-valued symbol sequence using a first shift register.

6. A method for decompressing at least two two-valued symbol sequences into a three-valued communication sequence comprising:
   converting a first two-valued symbol sequence into an intermediate symbol sequence;
   symbol-wise multiplying the intermediate symbol sequence with the second two-valued symbol sequence to generate the three-valued communication sequence;

further comprising generating the second two-valued symbol sequence using a second shift register.

7. A method for decompressing at least two two-valued symbol sequences into a three-valued communication sequence comprising:
- converting a first two-valued symbol sequence into an intermediate symbol sequence;
- symbol-wise multiplying the intermediate symbol sequence with the second two-valued symbol sequence to generate the three-valued communication sequence; and
- generating the first two-valued symbol sequence by cyclic-shifting a third two-valued symbol sequence.

8. The method according to claim 7, wherein the third two-valued sequence is a maximal length sequence.

9. A method for decompressing at least two two-valued symbol sequences into a three-valued communication sequence comprising:
- converting a first two-valued symbol sequence into an intermediate symbol sequence;
- symbol-wise multiplying the intermediate symbol sequence with the second two-valued symbol sequence to generate the three-valued communication sequence; and
- generating the first two-valued symbol sequence by multiplying a third two-valued sequence and a fourth two valued sequence.

10. The method according to claim 9, wherein the third two-valued sequence or the fourth two-valued sequence or both are maximal length sequences.

11. The method according to claim 9, wherein the third two-valued sequence has a component sum of one.

12. The method according to claim 10, wherein the third two-valued sequence or the fourth two-valued sequence or both have a component sum of one.

13. A method for decompressing at least two two-valued symbol sequences into a three-valued communication sequence comprising:
- converting a first two-valued symbol sequence into an intermediate symbol sequence;
- symbol-wise multiplying the intermediate symbol sequence with the second two-valued symbol sequence to generate the three-valued communication sequence; and
- generating the second two-valued symbol sequence by cyclic-shifting a fifth two-valued symbol sequence by a pre-determined number of components.

14. A system for decompressing at least two two-valued symbol sequences into a three-valued communication sequence comprising
- a converting unit configured to convert a first two-valued symbol sequence into an intermediate symbol sequence
- a multiplying unit configured to symbol-wise multiply the intermediate symbol sequence with the second two-valued symbol sequence to generate the three-valued communication sequence;
- wherein the three-valued communication sequence is a ternary sequence.

15. A computer readable medium having stored thereon a computer program element for making a computer perform a method for decompressing at least two two-valued symbol sequences into a three-valued communication sequence comprising
- converting a first two-valued symbol sequence into an intermediate symbol sequence
- symbol-wise multiplying the intermediate symbol sequence with the second two-valued symbol sequence to generate the three-valued communication sequence.

\* \* \* \* \*